United States Patent [19]

Henslin et al.

[11] Patent Number: 4,682,417

[45] Date of Patent: Jul. 28, 1987

[54] SPLITTING TOOL

[76] Inventors: Frederick L. Henslin, 619 Hallowell La.; Clarence Perkins, 4547 Murphy Ave., both of Billings, Mont. 59101

[21] Appl. No.: 859,337

[22] Filed: May 5, 1986

[51] Int. Cl.⁴ .............................................. B26B 29/00
[52] U.S. Cl. .......................................... 30/294; 30/121
[58] Field of Search ................. 30/294, 277, 121, 168, 30/167, 167.1, 167.2; 17/23, 21; 144/193 R, 193 C, 193 D

[56] References Cited

U.S. PATENT DOCUMENTS 2,283,017  5/1942  Scott ................................ 30/244 X
3,439,420  4/1969  Erickson .............................. 30/294

FOREIGN PATENT DOCUMENTS 1484635  3/1967  France ................................ 30/294

Primary Examiner—Douglas D. Watts
Attorney, Agent, or Firm—Richard C. Conover

[57] ABSTRACT

A carcass bone splitting tool having a rod-like shank being bent over at one end to form a handle. A foot member being connected at the other end of the rod-like shaft which is shaped to prevent rupture of entrails when the carcass is being opened. An elongate cutting blade member is mounted on the rod-like shank adjacent the foot member and is used for splitting open the bone of the carcass. A striker bar is also provided to drive the blade through the bone, such as the pelvic bone and breastbone, of the dead animal. The tool described herein is portable and when not in use, the blade is protected by the striker bar which can be carried by the splitting tool.

2 Claims, 6 Drawing Figures

FIG. 1
FIG. 2
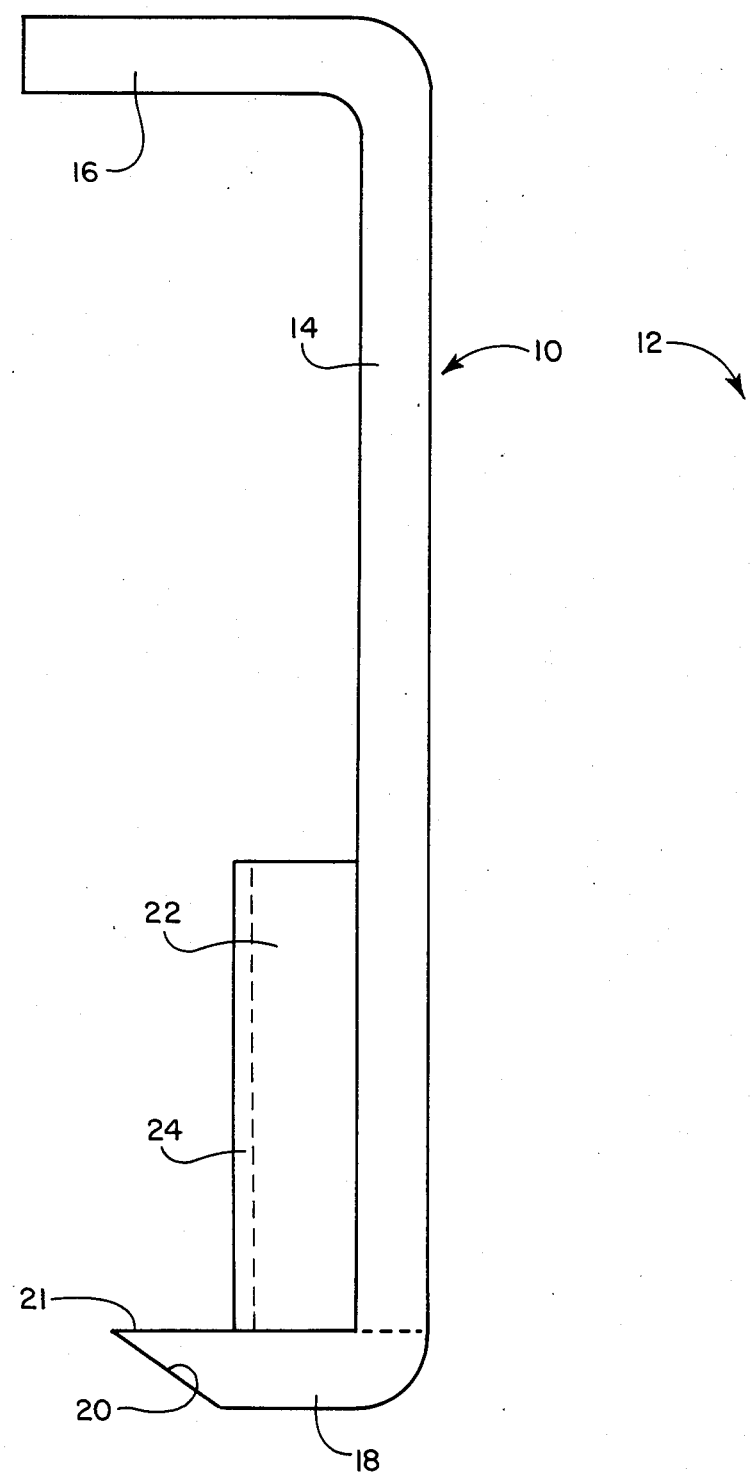
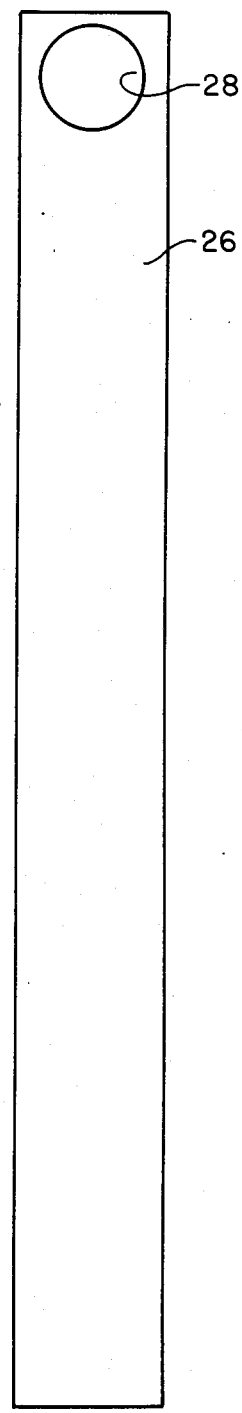

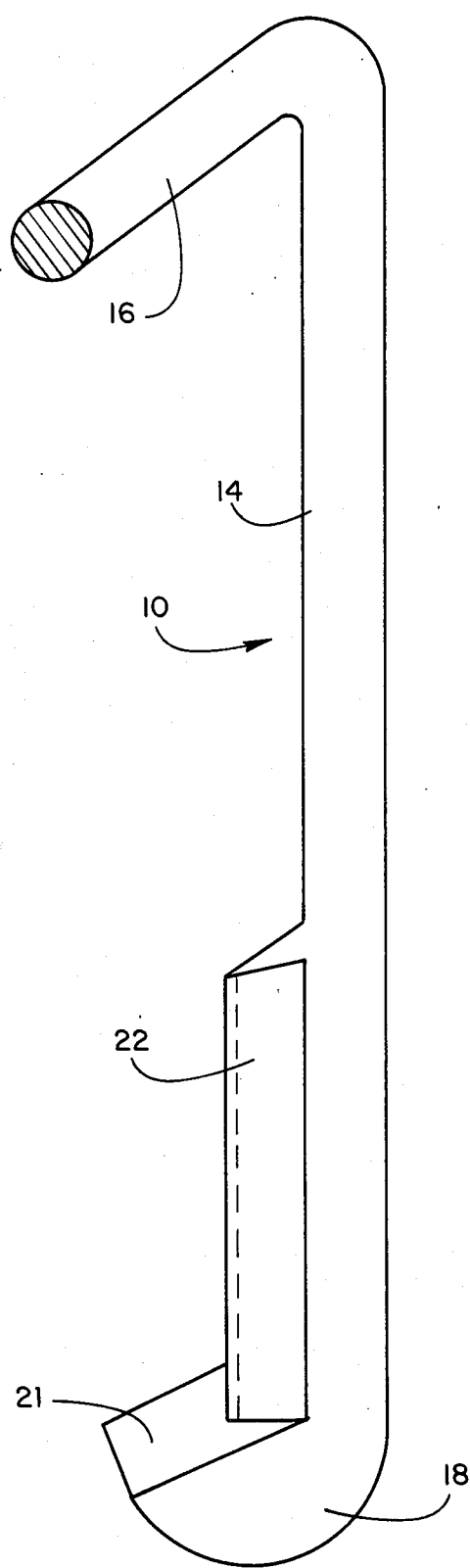
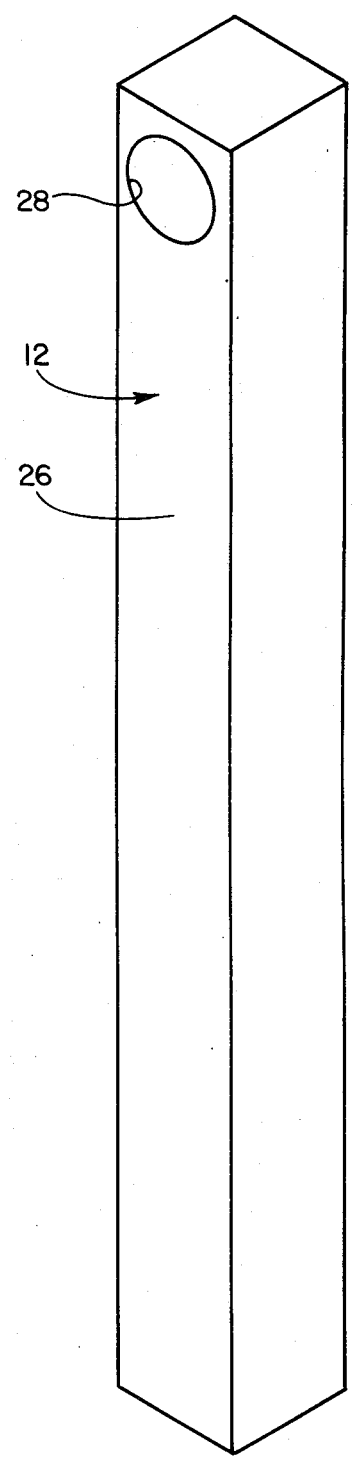
FIG. 3
FIG. 4

SPLITTING TOOL

BACKGROUND OF THE INVENTION

This invention relates to a tool for opening the carcasses of animals such as deer and elk and also has a purpose of providing a tool for splitting other objects such as wood. This tool is easy to use and is compact such that when not in use it can be carried in a pocket of the user. When the device is not being used, a portion of the tool is used to protect the cutting blade. The tool is intended to be used by hunters who require a portable device for splitting open carcasses which device is easy to use and can be used for cutting bone such as the pelvic bone and breastbone in the field after the animal has been shot.

Various carcass openers are known in the art such as described in U.S. Pat. No. 2,198,814 to Hart and U.S. Pat. No. 1,498,763 to Rendlich. The Hart patent describes a carcass opener which includes a blade for pulling through the carcass and a shield member to aid in the prevention of the rupturing of the entrails when the carcass is being opened. However, this device is not used for cutting the bone such as the breastbone or the pelvic bone of the animal being opened and is not easily dismantled to be carried in a dismantled condition by a hunter, for example.

The patent to Rendlich describes a tool having a cutting blade which is pushed through the carcass. If cartilage or bone is encountered, the cutting blade is struck with a mallet to drive the cutting blade through the bone or cartilage.

SUMMARY OF INVENTION

The present invention provides several advantages over the known carcass opening devices. The present invention includes a carcass splitting tool which has a rod-like shank being bent over at one end to form a handle. A foot member is connected at the other end of the rod-like shank. This foot member is inserted in an incision in the carcass to be opened and is shaped to prevent rupture of the entrails when the carcass is being opened. An elongate cutting blade member is mounted on the rod-like shank adjacent the foot member and is used for splitting open the carcass. A striker bar is also provided to drive the blade through the bone of the dead animal such as the pelvic bone and breastbone. The tool described herein is portable and when not in use, the blade is protected by the striker bar which can be carried by the splitting tool.

If the splitting tool is to be used for splitting wood, the striker bar can be used to hit the splitting tool to split the wood. This provides a portable and light weight tool which can be used by campers and also by children without the dangers involved in using an ax.

BRIEF DESCRIPTION OF THE DRAWINGS

In order that the invention may be clearly understood and readily carried into effect a preferred embodiment will now be described, by way of example only, with reference to the accompanying drawings wherein:

FIG. 1 is an elevational view of the pocket splitting tool;

FIG. 2 is an elevational view of the striker bar device;

FIG. 3 is a perspective view of the splitting tool device;

FIG. 4 is a perspective view of the striker bar device;

DESCRIPTION OF A PREFERRED EMBODIMENT

Figure 5:
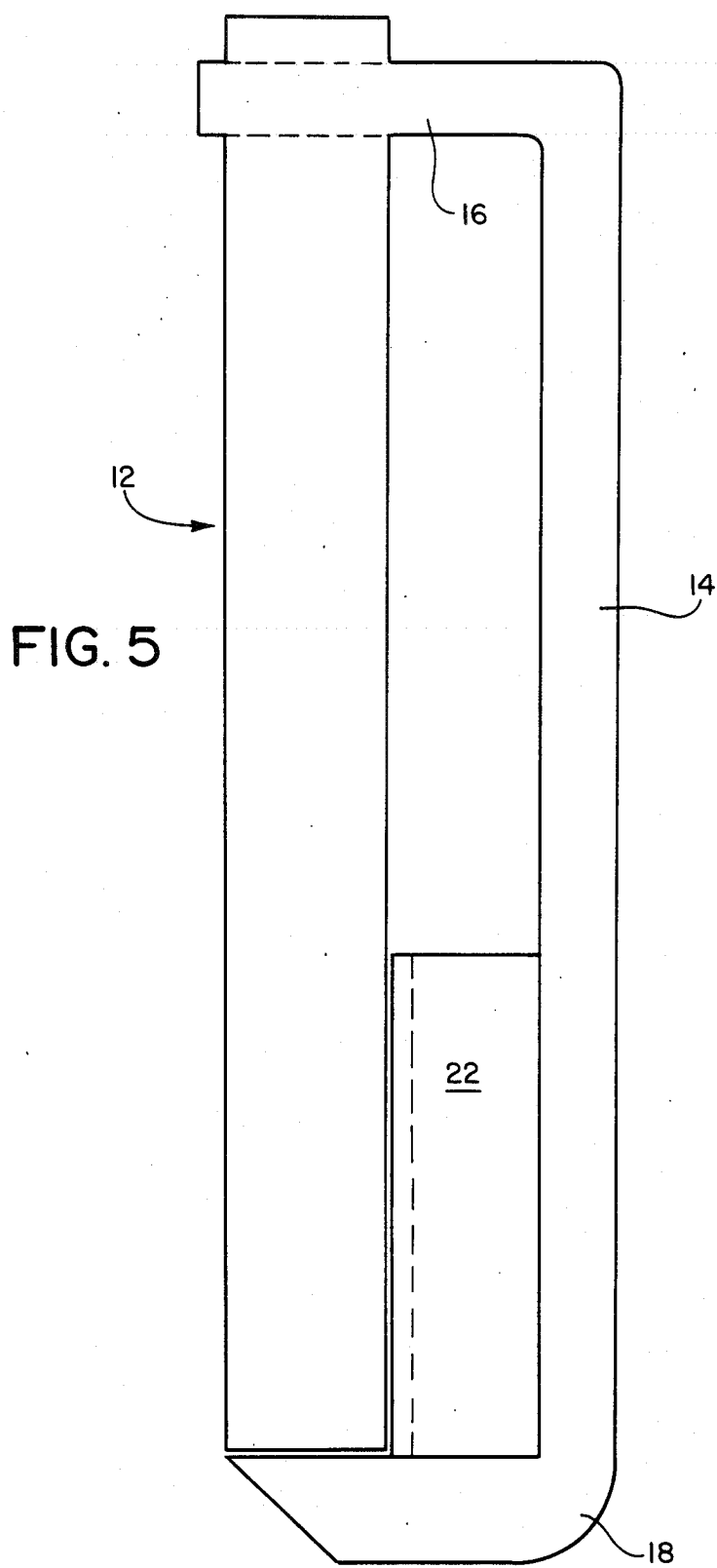
FIG. 5 is a perspective view of the carcass opening tool with the striker bar positioned on the splitting tool to protect the blade of the splitting tool when not in use.

The carcass opening tool is composed of two parts, namely a splitting tool 10 as shown in FIGS. 1 and 3 and a striker bar 12 as shown in FIGS. 2 and 4.

The splitting tool 10 has a shank 14 which is bent at one end thereof to form a handle 16. At the other end of shank 14 is located a foot member 18 which has a rounded bottom as shown in FIGS. 1 and 3 and also tapers in a lateral direction with respect to the shank 14 as shown at 20.

A blade element 22 having a sharpened front edge 24 is mounted to the shank 14 of the splitting tool 10 just above the foot 18.

The striker bar 12 as shown in FIGS. 2 and 4 is comprised of an elongate bar 26 having a transverse bore 28 formed therein.

The transverse bore 28 is dimensioned to slideably fit on the handle 16 of the splitting tool 10 when the carcass opening tool is not being used.

When the device is not being used, the striker bar 12 is positioned with the transverse bore 28 surrounding the handle 16. The length of the striker bar 12 is such that when the striker bar 12 is positioned on handle 16, the end of striker bar 12 opposite the transverse bore 28 rests on an upper flat surface 21 of foot 18 as shown in FIG. 5. In this position the striker bar 12 protects the cutting blade 24 from damage.

To illustrate the use of the present invention, the "field dressing" of a deer by a hunter will now be described by way of example only. First the genitals of the deer are located and removed. Next the pelvic bone is located and an incision made over the pelvic bone. The foot 18 of the splitting tool is inserted through the incision to a position just below the pelvic bone. With the handle 16, the foot member 18 is drawn upwardly against the inside surface of the pelvic bone. The striker bar 12 is then used to strike the back side of shank 14 to drive the cutting edge 24 of blade 22 against the pelvic bone to split the pelvic bone. The bladder and the rectum of the deer are positioned directly beneath the pelvic bone and it is important not to rupture the bladder for otherwise the meat may be spoiled. Since the foot 18 is rounded and has a taper 20, and since the foot 18 is being drawn upwardly against the pelvic bone, the foot 18 deflects the bladder downwardly thereby preventing the bladder from rupturing. The striker tool 10 is then struck the number of times required to complete the splitting of the pelvic bone.

Next a knife is inserted into the abdominal cavity of the animal with the blade facing the head of the animal and the skin covering the abdominal cavity is slit towards the breastbone. When the breastbone is encountered, the splitting tool 10 is again used to split the breastbone. The foot 18 of the splitting tool 10 is inserted just beneath the breastbone and with the handle 16 the splitting tool 10 is pulled upwardly so that the upper edge 21 of the foot 18 is positioned adjacent the bottom side of the breastbone. The striker bar 12 is then again used to drive the cutting blade 22 through the breastbone.

Once this has been completed, the tool can be cleaned and the striker bar 12 again inserted on the handle 16 of the splitting tool 10 for ease of carrying as shown in FIG. 5.

With the present invention, a carcass can be opened easily and quickly. The tool is especially adapted for opening carcasses of wild deer and elk and is of great value to hunters who need to field dress these animals. The particular tool here described is portable and easy to use and the striker bar is used to protect the blade of the splitting tool when the tool is not being used.

Figure 6:
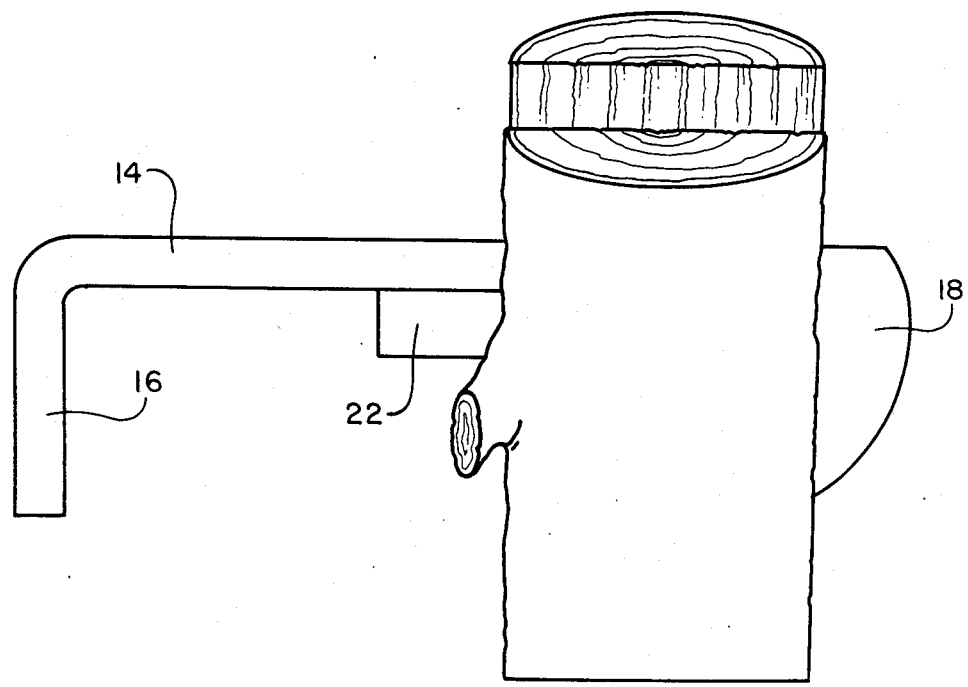
FIG. 6 is a perspective view of the splitting tool used in splitting wood.

Further, although not specifically described, this tool has uses other than opening carcasses. For example, and as shown in FIG. 6, it can be used for splitting wood, and can be used by younger persons to split wood without the danger of using an ax or a saw.

While the fundamental novel features of the invention have been shown and described, it should be understood that various substitutions, modifications and variations may be made by those skilled in the art without departing from the spirit or scope of the invention. Accordingly, all such modifications and variations are included in the scope of the invention as defined by the following claims.

I claim:

1. A splitting device for splitting open a carcass or wood and the like comprising:

a straight shank;

the shank being bent at one end thereof to form a handle which extends in a transverse direction from the shank;

a foot member secured to the other end of the shank, which foot member extends in the transverse direction;

the foot member being rounded on the bottom surface and further having a flat top surface, the foot member further tapering in the transverse direction at the bottom thereof to a smaller dimension at the edge of the foot furthest from the shank;

an elongate cutting blade member having a trailing edge which has the same lateral dimension as the cross-sectional dimension of the shank, the cutting blade member being secured to the shank adjacent and above the foot member, the cutting blade member further having a leading cutting edge which faces in the transverse direction (.); and an elongate striker bar having a bore at one end shaped to receive the handle and having a length such that when the striker bar receives the handle, the other end of the striker bar rests on the top surface of the foot member.

2. A splitting device for splitting open a carcass or wood and the like comprising:

a shank;

a handle member secured at one end of the shank and extending in a transverse direction from the shank;

a foot member secured at the other end of the shank which foot member also extends in the transverse direction;

the foot member being rounded on the bottom surface thereof and further having a flat top surface, the foot member further tapering in the transverse direction at the bottom thereof to a smaller dimension at the edge of the foot member furthest from the shank;

an elongate cutting blade having a trailing edge secured to the shank adjacent and above the foot member and a leading cutting edge facing in the transverse direction; and a striker bar including an elongate striker bar having a bore at one end shaped to receive the handle member and having a length such that when the striker bar receives the handle the other end of the striker bar rests on the top surface of the foot member.

* * * * *